United States Patent [19]

Tateoka et al.

[11] 4,180,307

[45] Dec. 25, 1979

[54] TWO-DIMENSIONAL SCANNING APPARATUS WITH CONSTANT SPEED SCAN

[75] Inventors: Masamichi Tateoka; Takao Tsuji, both of Kawasaki; Setsuo Minami; Kazuya Matsumoto, both of Yokohama; Naoto Kawamura, Inagi; Kazuo Minoura, Yokohama, all of Japan

[73] Assignee: Canon Kabushiki Kaisha, Tokyo, Japan

[21] Appl. No.: 931,927

[22] Filed: Aug. 8, 1978

[30] Foreign Application Priority Data

Aug. 12, 1977 [JP] Japan .................... 52/96719

[51] Int. Cl.² .................................... G02B 27/17
[52] U.S. Cl. .................................... 350/6.5
[58] Field of Search .................... 350/6.5–6.91; 358/206, 207, 208

[56] References Cited

U.S. PATENT DOCUMENTS

| | | | |
|---|---|---|---|
| 3,573,849 | 4/1971 | Herriott | 350/6.8 |
| 3,961,838 | 6/1976 | Zanoni | 350/6.8 |
| 3,973,833 | 8/1976 | Lawson | 350/6.8 |
| 4,108,532 | 8/1978 | Minoura | 350/6.6 |

*Primary Examiner*—Jon W. Henry
*Attorney, Agent, or Firm*—Fitzpatrick, Cella, Harper & Scinto

[57] ABSTRACT

Two-dimensional scanning apparatus scans a stationary two-dimensional surface with a first deflector and a second deflector which deflects a light beam in a direction perpendicular to the deflecting direction of said first deflector. An afocal optical system is provided between said first and second deflectors, while an imaging lens system is provided between said second deflector and the scanning surface. Said first deflector, afocal optical system and imaging lens system cooperate to displace the light beam at a constant speed in a principal scanning direction on the scanning surface, while said second deflector and imaging lens system cooperate to displace the light beam at a constant speed in an auxiliary scanning direction on said surface.

4 Claims, 10 Drawing Figures

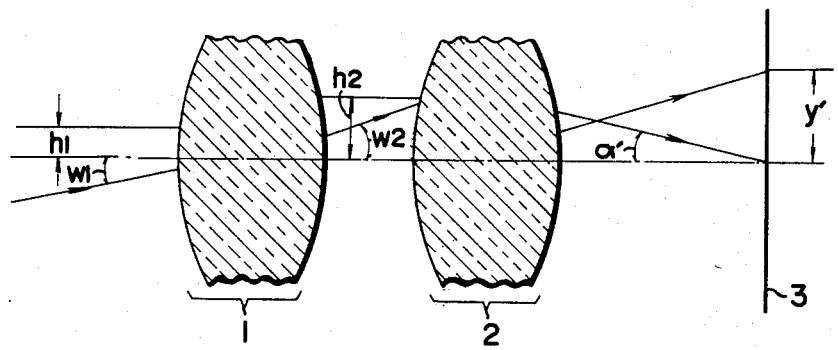
FIG. IA
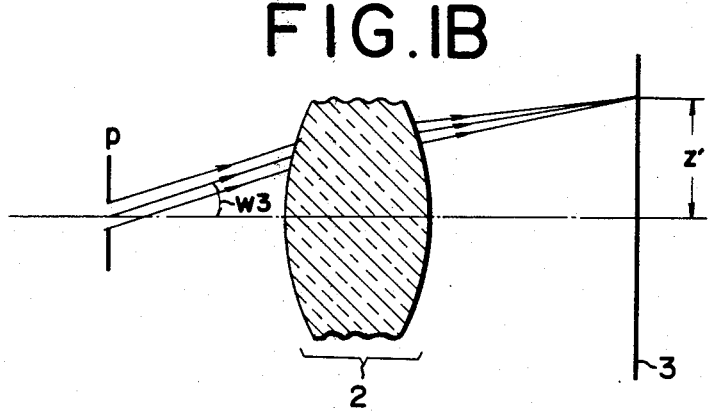
FIG. IB
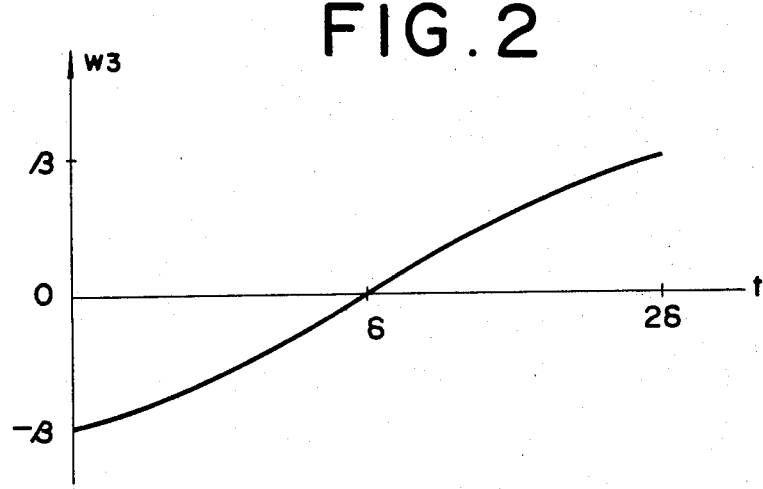
FIG. 2

FIG. 4
A
B
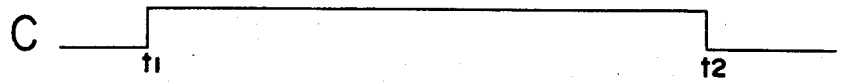
C   t1                              t2
D
E
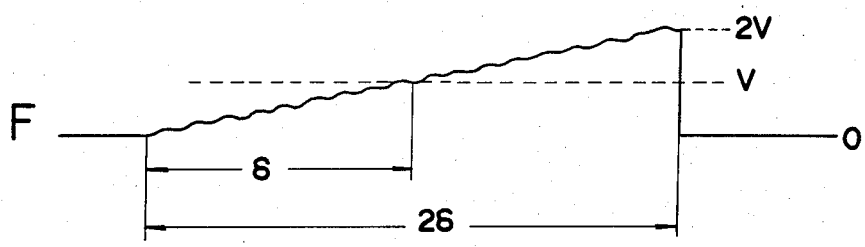
F

TWO-DIMENSIONAL SCANNING APPARATUS WITH CONSTANT SPEED SCAN

BACKGROUND OF THE INVENTION

1. Field of the Invention

The present invention relates to a scanning apparatus for conducting a two-dimensional scanning.

2. Description of the Prior Art

In usual two-dimensional scanning with a light beam there are employed a pair of deflectors provided with reflecting surfaces, wherein a first deflector with a constant angular velocity deflects an incident light beam into a first direction, while a second deflector with a constant angular velocity receives thus deflected light beam and deflects said beam into a second direction perpendicular to said first direction, the light beam thus deflected two-dimensionally being focused by an imaging lens of a distortion characteristic $y = f \cdot \theta$ thereby achieving a two-dimensional scanning. In such conventional two-dimensional light beam scanning apparatus, said first and second deflectors are located close to each other since otherwise the reflecting surface of second deflector has to be made larger in order to receive the light beam deflected by the first deflector when the deflecting angle thereof is increased. Also the focusing of the light beam deflected by said first and second deflectors onto the scanning surface is achieved by a lens with a distortion characteristic of $y = f \cdot \theta$ because the light beam, subjected to the deflections generally of constant angular velocities in said first and second deflectors, will not provide a displacement linear in time on the scanning surface if focused by a lens with a distortion characteristic of $y = f \cdot \tan \theta$, for example an ordinary photographic lens.

In this foregoing equations, f indicates the focal length of imaging lens, and $\theta$ is the angle formed between the optical axis of said lens and the incident light beam thereto.

SUMMARY OF THE INVENTION

The object of the present invention is to provide a novel two-dimensional scanning apparatus of a structure different from the conventional arrangement explained above.

An another object of the present invention is to provide a scanning apparatus achieving a constant-speed displacement of scanning spot in two perpendicular directions on the scanning surface even when a lens with a distortion characteristic of $y = f \cdot \tan \theta$ is employed as the imaging lens for scanning.

The two-dimensional scanning apparatus of the present invention is featured by a first deflector, a second deflector for deflecting the light beam deflected by said first deflector in a plane perpendicular to the deflecting plane of said first deflector, a scanning surface to be scanned by the light beam deflected by said second deflector, an afocal optical system located between said first and second deflectors, and an imaging lens system provided between said second deflector and scanning surface, wherein a first optical system composed of said first deflector, afocal optical system and imaging system comprising an optical means for causing a constant-speed displacement of light beam in a principal scanning direction on said scanning surface, while a second optical system composed of said second deflector and imaging lens system comprising an optical means for causing a constant-speed displacement of light beam in an auxiliary scanning direction orthogonal to said principal scanning direction on the scanning surface.

In the following preferred embodiment of the present invention there is employed, as the imaging lens, an ordinary lens of a characteristic $y = f \cdot \tan \theta$, and the constant-speed displacement of light beam in the auxiliary scanning direction is achieved by the use, as the second deflector, of a deflector of a non-constant angular velocity. The deflecting angle w3 of said deflector is represented by $$w3 = \tan^{-1}\{C/f \times (t - \delta_2)\}$$

wherein f is the focal length of imaging lens system, C a constant and $\delta_2$ a time equal to a half of period required for auxiliary scanning of a line.

Further, in case of using a deflector of a constant angular velocity for the first deflector in combination with the above-mentioned $f \cdot \tan \theta$ as the imaging lens, the constant-speed displacement of light beam in the principal scanning direction can be achieved by employing an afocal optical system of which angular magnification $\gamma$ defined by $\gamma = \tan w2/w1$, wherein w1 is the angle between the optical axis of said afocal optical system and the incident light beam thereto while w2 is the angle between the optical axis of said afocal optical system and the emergent light beam therefrom.

Also in case the first deflector performs a deflection with a non-constant angular velocity, the constant-speed displacement of light beam in the principal scanning direction can be achieved by various combinations of angular magnification of afocal optical system and of angular magnification of the first deflector. For example, in case the deflection angle w1 of the first deflector is represented by $w1 = \tan^{-1}\{C/f \times (t - \delta_1)\}$ similar to that for the above-mentioned second deflector, wherein $\delta_1$ being a time equal to a half of period required for the scanning of one line in the principal scanning direction, the angular magnification $\gamma$ of the focal optical system can be equal to unity.

In the scanning apparatus of the present invention, the angular magnification of said afocal optical system is selected smaller than unity, in order to alleviate undesirable effect on the scanning beam resulting from an inclination of the first deflector. Also the deflecting surfaces of said first and second deflectors are so located as to be mutually conjugate with respect to the afocal optical system.

BRIEF DESCRIPTION OF THE DRAWINGS

FIGS. 1A and 1B are drawings illustrating the functions of an embodiment of the two-dimensional scanning apparatus of the present invention;

FIG. 2 is a deflection angle-time characteristic chart of the second deflector employed in the scanning apparatus shown in FIG. 1;

FIGS. 4A-4F are time-charts of the scanning apparatus shown in FIG. 3.

DESCRIPTION OF THE PREFERRED EMBODIMENT

Figure 3:
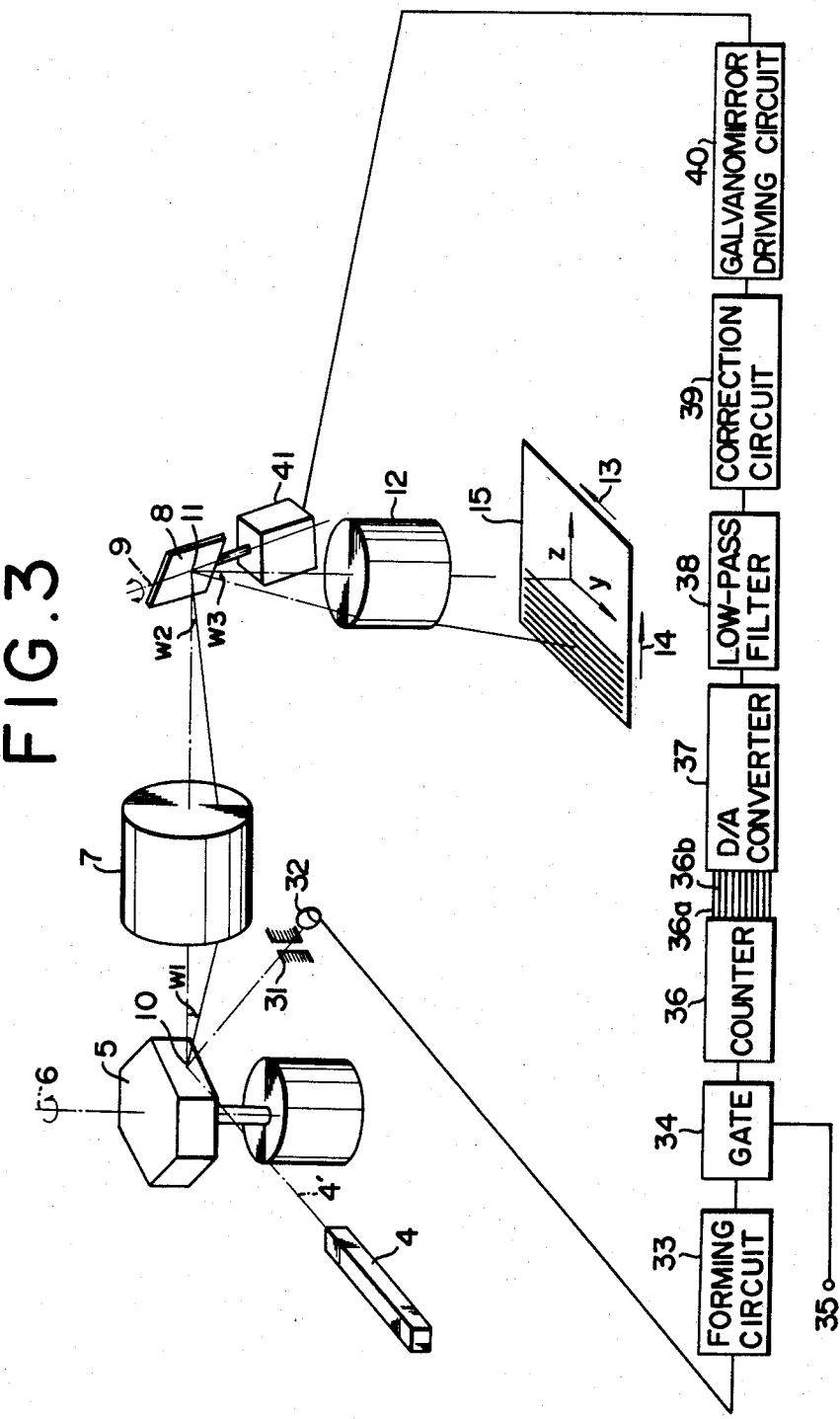
FIG. 3 is a schematic view of an embodiment of the two-dimensional scanning apparatus of the present invention.

In general two-dimensional scanning there are employed a first deflector and a second deflector respectively corresponding to a principal scanning an auxiliary scanning. For example in the ordinary raster scanning, the first deflector for horizontal deflection performs the principal scanning while the second deflector for vertical deflection performs the auxiliary scanning. Therefore, the first deflector is most conveniently composed of a polygonal rotary mirror provided with a constant deflecting angular velocity and capable of a high-speed deflection, while the second deflector can be composed of a deflector with a relatively deflecting speed, for example a galvanomirror.

In the following description of the embodiment of the present invention, there will be employed, as a deflector for the principal scanning, a polygonal rotary mirror with a constant angular velocity of deflection or a galvanomirror with a non-constant angular velocity, and, as a deflector for the auxiliary scanning, a galvanomirror with a non-constant angular velocity of deflection.

Now there will be explained a scanning system consisting of a principal deflector (first deflector), an afocal optical system, an auxiliary deflector (second deflector) and an imaging lens system of a $f \cdot \tan \theta$ characteristic and capable of providing constant-speed displacement of the light beam spot both in the principal and auxiliary scanning directions on the scanning plane.

At first explained is the case of using, as the principal deflector, a deflector of a constant deflecting angular velocity, for example a polygonal rotary mirror. FIG. 1A is a schematic view of the optical system in the principal deflecting direction, where there are shown an afocal lens system 1, an imaging lens system 2, and a scanning plane 3. Supposing that the deflection angle obtained by the first (principal) deflector is w1, the light beam enters the afocal lens system 1 with an angle w1, emerges therefrom with an angle w2, again enters the imaging lens system with an angle w2 and forms an image with a height y' in the principal scanning direction passing through the optical axis on the scanning plane. From the requirement of constant-speed scanning, the image height y' obtained by the imaging lens system 2 should be proportional to the deflection angle w1 of principal deflector, so that:

$$y' = kw1 = f \tan w2 \quad (1)$$

wherein k is a constant, and f is the focal length of the imaging lens system 2.

From the paraxial theory k is equal to the combined focal length f of the afocal lens system and the imaging lens system, so that:

$$y' = kw1 = fw1 \quad (2).$$

From the paraxial theory f can be represented by:

$$f = h1/\alpha' = h1/h2 \times h2/\alpha' \quad (3)$$

wherein
h1: entering height of afocal lens system
h2: emergent height of afocal lens system
α': converted emergent angle of combined lens system.

Also the paraxial theory gives from the equation (3):

$$\gamma = h1/h2, f = h2/\alpha' \quad (4)$$

wherein γ is the angular magnification of the afocal lens system. Inserting the equation (4) into (3) there is obtained:

$$k = f = \gamma f \quad (5).$$

From the equations (1) and (5) it is therefore required to satisfy $k = f \tan w2/w1 = f = \gamma f$. Thus y' can be rendered proportional to w1 when the afocal lens system is provided with an angular magnification $\gamma = \tan w2/w1$, whereby a constant speed scanning is obtained from a rotation with a constant angular velocity.

Also in order to achieve a constant-speed displacement of scanning spot in the auxiliary scanning direction on the scanning plane, the deflecting angular velocity of the second deflector for deflecting the light beam in said auxiliary second deflecting direction perpendicular to the deflecting direction achieved by the first deflector, is to be of the following character.

FIG. 1B is a cross-sectional view of the optical system for auxiliary scanning along a plane perpendicular to that of FIG. 1A, wherein the point P represents the deflecting point of the second deflector. Supposing that the deflecting angle of second deflector is w3, the light beam entering the imaging lens system 2 with said angle forms an image with a height z' in an auxiliary scanning direction passing through the optical axis on the scanning plane. Since $z' = f \tan w3$, the following equation (7) can be obtained by differentiating the above equation with t:

$$dz'/dt = f \sec^2 w3 \cdot dw3/dt \quad (7).$$

As the beam is of a constant speed in this equation, dz'/dt should be constant, or:

$$dz'/dt = C \quad (C:constant) \quad (8)$$

Thus the equation (7) can be rewritten as $$C = f \sec^2 w3 \cdot dw3/dt$$

which is integrated to obtain:

$$w3 = \tan^{-1}(Ct/f) + C' \quad (C': \text{integration const}) \quad (9).$$

As the equation (9) is valid for a half of incident angle for the lens of a characteristic $z = f \cdot \tan \theta$, w3=0 when t=0 so that C'=0. Therefore:

$$w3 = \tan^{-1}(Ct/f) \quad (10).$$

Now supposing that the time required for a deflection by the second deflector to cover a range $-\beta \sim \beta$ is equal to $2\delta 1$, said range being the range of incident angle to the above-mentioned lens, the term t in the equation (10) should be replaced by $t - \delta 1$ in order to obtain $w3 = -\beta$ at $t=0$, $w3=0$ at $t=\delta 1$ and $w3=\beta$ at $t=2\delta 1$.

Stated differently the deflection of the second deflector should be performed according to the following equation:

$$w3 = \tan^{-1}\{C/f \times (t - \delta 1)\} (0 \leq t \leq 2\delta) \quad (11).$$

The relationship between w3 and the time t represented in the equation (11) is graphically shown in FIG. 2.

Thus the light beam deflected by the second deflector according to the equation (11) performs a constant-speed displacement in the auxiliary scanning direction passing through the optical axis of the imaging lens on the scanning plane.

However it is to be noted that the displacement of light beam deflected by the first deflector is of a strictly constant speed in the principal scanning direction passing through the optical axis but is not strictly constant in speed in other principal scanning directions not passing through the optical axis, due to the effect of sound deflector. The same applies also to the deflection by the sound deflector. The displacing speed of the light beam deflected by the second deflector is strictly constant in the auxiliary scanning direction passing through the optical axis but is not strictly constant in other auxiliary scanning directions not passing through the optical axis, due to the effect by the first deflector.

Consequently, when there is required a constant-speed scanning in an arbitrary direction at an arbitrary position in a two-dimensional plane, the range of deflecting angle of the first deflector and that of the second deflector are to be determined from the permissible tolerance in said constant speed.

In general, the scanning can be considered as of a constant speed at an arbitrary position in a two-dimensional plane in the following two cases. The first case is represented by a scanning area which is short in the principal scanning direction and long in the auxiliary scanning direction, wherein the deflecting angle of the first deflector is small while that of the second deflector is large. The second case is represented by a scanning area which is long in the principal scanning direction and short in the auxiliary scanning direction, wherein the deflecting angle of the first deflector is large while that of the second deflector is small. When the deflecting angle of the second deflector is smaller, it can be supposed that:

$$z = f \tan w3 \simeq fw3 \quad (12).$$

Differentiation with t gives $dz/dt = f dw3/dt = C$, which is again integrated to obtain:

$$w3 = Ct/f \quad (13).$$

In this case, therefore, a deflector performing a constant-angular velocity deflection, such as a polygonal rotary mirror or a saw-tooth vibration mirror, can be used as the second deflector.

Also it is possible to compensate the error resulting from the inclination of the first deflector, a polygonal rotary mirror in this case, by selecting the angular magnification $\gamma$ of the afocal optical mirror system in the equation (6) smaller than unity. Said error of inclination of scanning beam results from an angular error of the reflecting surfaces of said deflector with respect to the rotary axis thereof, or from the inclination of said rotary axis itself. Said inclination of the light beam after passing the afocal lens system is equal to the inclination of the light beam entering said afocal lens system multiplied by the angular magnification thereof. Consequently it is possible to alleviate the effect of the inclination of the first deflector by selecting the angular magnification of the afocal lens system smaller than unity.

More specifically, when the first deflector or a polygonal rotary mirror has a surface inclination equal to $\Delta\beta$, the inclination resulting therefrom in a direction perpendicular to the scanning direction is $2\Delta\beta$. The angle of inclination of light beam emerging from the afocal lens system is represented by $w2 = \tan^{-1}(2\Delta\beta\cdot\gamma)$. Thus the ratio of angles of inclination before entering and after emerging from the afocal lens system is $T = w2/w1 = \tan^{-1}(2\Delta\beta\cdot\gamma)/2\Delta\beta$, where in a first-order approximation $\tan^{-1}(2\Delta\beta\cdot\gamma) \simeq 2\Delta\beta\gamma \ldots\ldots (13)$, because the angle of inclination is small, so that:

$$T = w2/w1 = 2\Delta\beta\cdot\gamma/2\Delta\beta = \gamma \quad (14).$$

This equation indicates that the ratio of angles of inclination before entering and after emerging from the afocal lens system is equal to $\gamma$. It is therefore possible to reduce the effect resulting from the inclination of reflecting surface of polygonal mirror by reducing the value of $\gamma$.

Although in the foregoing embodiment the principal deflector is provided with a constant angular velocity, it is also possible to use, as the principal deflector, a deflector performing a reciprocating vibration with a non-constant angular velocity, for example a galvanomirror. In such case there can be considered various combinations of the non-constant angular velocity characteristic and the distortion characteristic of the afocal lens system in order to achieve a constant-speed displacement of the light beam. As an example, a constant-speed principal scanning on the scanning plane can be realized by selecting the angular magnification $\gamma$ of said afocal lens system equal to unity ($\gamma = 1$) and by causing the principal deflector to rotate under a condition $w1 = \tan^{-1}\{C/f \times (t - \delta 2)\}$, wherein $\delta 2$ is a time equal to a half of the principal scanning period of one line.

An example of the scanning optical system composed according to the foregoing description is schematically shown in FIG. 3.

Referring to FIG. 3 showing the basic arrangement of the two-dimensional scanning apparatus of the present invention, a parallel light beam from a parallel beam source 4 such as a laser is introduced into a first deflector 5 which is composed of a polygonal rotary mirror rotated about an axis 6 in a direction indicated by the arrow. The light beam deflected by said first deflector 5 is introduced, through an afocal lens system 7, to a second deflector 8 which is composed of a planar mirror vibrated about an axis 9 as indicated by the arrow. The light beam deflected by said second deflector 8 is two-dimensionally deflected as the rotary axis 6 of first deflector 5 and the vibrating axis 9 of second deflector 8 are mutually orthogonal. The afocal lens system 7 is provided with a characteristic represented by the equation (6). The first deflector 5 and the second deflector 8 are respectively placed at the points 10 and 11 which are mutually conjugate with respect to the pupil of the afocal lens system 7. Consequently the image of the first deflector 5 formed by the afocal lens system 7 is focused on the second deflector 8. Stated differently, the light beam passing through the afocal lens system 7 always enters the second deflector 8 however large is the deflection angle w1 of the first deflector 5. Also the relation between the deflection angle w1 of the first deflector 5 and that w2 of the second deflector 8 is represented by $\gamma = \tan w2/w1$. As the direction of deflection of the first deflector 5 is independent from that of the second deflector 8, the light beam deflected by the first deflector 5 is reflected by the second deflector while maintaining the relation represented by the equation (6) and enters an imaging lens 12 provided with a characteristic $y = f \tan \theta$.

Consequently the light beam focused by said imaging lens 12 performs, due to the deflection by the first deflector 5, a scanning in the direction of arrow 13 at a constant speed on the scanning plane 15. Also since the afocal lens system is provided with a characteristic $\gamma = \tan w2/w1$, it is rendered possible, as explained in the foregoing, to compensate the inclination resulting from a manufacturing error in the first deflector or polygonal rotary mirror, and thus to correct aberration (error in pitch) in a direction of arrow 14 perpendicular to the scanning direction 13.

The second deflector 8 performs a deflection in a direction orthogonal to the deflecting direction of the first deflector 5, said deflection being realized under a condition $w3 = \tan^{-1}\{C/f \times (t-\delta)\}$. Consequently the light beam deflected by the second deflector 8 in a direction orthogonal to the deflecting direction of the first deflector 5 is focused by the imaging lens 12 of a characteristic $y = f\tan\theta$, thereby performing a scanning in a direction of arrow 14 with a constant speed on the scanning plane 15.

Now there will be given an explanation on an electric circuit for driving the second deflector (galvanomirror) under a condition of equation (11) $w3 = \tan^{-1}\{C/f \times (t-\delta)\}$ while making reference to FIG. 3 and to a time chart shown in FIG. 4. In FIG. 3 there are shown a slit 31 elongated in a direction orthogonal to the deflecting direction of the beam reflected by the rotary polygonal mirror 5, a photodetector 32, a wave forming circuit 33, a known gate circuit 34 receiving control signals therefor at a terminal 35, a counter 36 for counting pulses from said gate circuit, a digital-to-analog converter 37, a low-pass filter 38, a correction circuit 39, a galvanomirror drive circuit 40 composed of a power amplifier for driving a galvanomirror, a driver 41 of a structure similar to a DC ammeter, and a galvanomirror 8 provided with a reflecting surface.

The light beam 4' is deflected by the rotation of polygonal rotary mirror 5 and passes the slit 31 at a certain timing. Upon said passing the photodetector 32 releases an output signal which constitutes a series of pulses corresponding to the revolution and number of reflecting faces of said rotary mirror, as shown in FIG. 4A. The pulses shown in FIG. 4A are formed into a pulse train shown in FIG. 4B, which is supplied to the counter 36 through the gate 34 when it is opened at $t_1$ by a signal supplied to the input terminal 35, but is not supplied to said counter 36 when said gate 34 is closed. FIG. 4C and FIG. 4D respectively show a gate signal and the pulse train thus gated. The counter 36 is composed of a known binary counter provided with output terminals 36a, 36b, 36c, . . . for indicating the state of digits constituting said binary counter. The digital-to-analog converter 37 is so structured to perform a digital-to-analog conversion in relation to the states of the outputs at the terminals 36a, 36b, 36c, . . . and to provide a saw-tooth output signal shown in FIG. 4E. Since the output signal of a digital-to-analog converter generally shows stepwise changes as shown in FIG. 4E, it is preferable to provide a low-pass filter 38 between the converter 37 and the galvanomirror driver 40 in order to smooth the signal as shown in FIG. 4F. The saw-tooth signal thus smoothed is introduced into a correction circuit 39 consisting of a known approximation circuit composed of a combination of operational amplifiers and diodes.

Said correction circuit 39 functions, upon receipt of a saw-tooth input signal as shown in FIG. 4F, to generate a signal $w3 = \tan^{-1}\{C/f \times (t-\delta)\}$ as shown in FIG. 2, and such circuit can be easily composed by a known experimental function generator, for example a circuit shown in p.267 of "Source Book of Electronic Circuit", McGraw-Hill Book Company.

The experimental function generator as mentioned above functions to generate a signal curve in an approximation composed of a series of linear portions, and is very convenient for obtaining an approximate curve when the desired curve is known.

Thus, for the purpose of present circuit, there will be provided two such experimental function generators connected in series, with the rectifiers of first and second function generators being connected in mutually opposite directions. The saw-tooth signal shown in FIG. 4F is supplied as the input signal of a peak voltage 2V to the first function generator, and the circuit is structured in such a manner that the first function generator alone functions in response to the change of input voltage while it changes in a range from 0 to V, and the second function generator alone functions in response to the change of input voltage while it changes in a range from V to 2V.

In this manner there is generated a signal curve from 0 to $\delta$ in FIG. 2 during the function of the first experimental function generator while there is generated a signal curve from $\delta$ to $2\delta$ during the function of the second experimental function generator.

The output signal from said correction circuit 39 is power amplified by the galvanomirror drive circuit 40 and is utilized for driving the driver 41. Thus the deflection angle of the galvanomirror 8 changes as shown in FIG. 2 in response to the output signal from the correction circuit 39.

The counter 36 is so structured as to return to the original state by means of an unrepresented reset circuit at the time $t_2$ shown in FIG. 4C when the signal from the input terminal 35 is terminated, whereby the saw-tooth signal also returns to the original state as shown in FIG. 4F. Also the signal supplied to the input terminal 35, continued from the start to the end of auxiliary scanning on the recording medium, can be easily generated by an unrepresented means.

Although the principal deflector is composed of a polygonal rotary mirror in the foregoing embodiment, the principal deflector can be either said first deflector or said second deflector in case the principal deflector is composed of a galvanomirror.

What we claim is:

1. A two-dimensional scanning optical system comprising:

a first deflector for deflecting a light beam in a determined direction;

a second deflector for deflecting a light beam received from said first deflector, said deflection being performed in a plane perpendicular to the deflecting plane of said first deflector;

a scanning plane subjected to a two-dimensional scanning by a light beam emergent from said second deflector;

an afocal optical system provided between said first and second deflectors; and an imaging lens system provided between said second deflector and said scanning plane;

wherein a first optical system composed of said first deflector, afocal optical system and imaging lens system comprising an optical means for causing the light beam to displace at a constant speed in a first direction on said scanning plane; and a second optical system composed of said second deflector and said imaging lens comprising an optical means for causing the light beam to displace at a constant speed in a second direction orthogonal to said first direction on said scanning plane.

2. A two-dimensional scanning optical system according to the claim 1, wherein said imaging lens system satisfying a relation:

$$y = f \tan\theta$$

wherein f is the focal length of said imaging lens system, $\theta$ is the angle formed between the optical axis of said imaging lens system and the light beam entering the same, and y is the distance from the optical axis of said imaging lens system to the focal position of light beam on the focal plane of said imaging lens system; and said second deflector showing a deflection angle w3 satisfying a following relation:

$$w3 = \tan^{-1}\{C/f\,(t-\delta 2)\}$$

wherein C is a constant, $\delta 2$ is a time equal to a half of a period required for a scanning on the scanning plane of one line by said second deflector, and t is time.

3. A two-dimensional scanning optical system according to the claim 2, wherein said first deflector being a deflector performing a rotation of a constant angular velocity, and said afocal optical system being provided with an imaging magnification $\gamma$ represented by:

$$\gamma = \tan w2/w1$$

wherein w1 is an angle formed between the optical axis of said afocal optical system and the light beam entering the same, and w2 is an angle formed between the optical axis of said afocal optical system and the light beam emerging therefrom.

4. A two-dimensional scanning optical system according to the claim 2, wherein said first deflector showing a deflection angle w1 satisfying a following relation:

$$w1 = \tan^{-1}\{C/f\,(t-\delta 1)\}$$

wherein C is a constant, $\delta 1$ is a time equal to a half of a period required for a scanning on the scanning plane of one line by the first deflector, and t is time; and said afocal optical system being provided with an imaging magnification $\gamma$ equal to unity.

* * * * *

UNITED STATES PATENT AND TRADEMARK OFFICE
CERTIFICATE OF CORRECTION

PATENT NO. : 4,180,307

DATED : December 25, 1979

INVENTOR(S) : MASAMICHI TATEOKA, ET AL

It is certified that error appears in the above-identified patent and that said Letters Patent are hereby corrected as shown below:

Column 2, line 40, change "focal" to --afocal--.

Column 3, line 48, change "f" to --$\bar{f}$--.

Column 3, in equation "(2)", change "fw1" to --$\bar{f}$w1--.

Column 3, line 53, change "f" to --$\bar{f}$--.

Column 3, line 55, in equation "(3)", change "f" to --$\bar{f}$--.

Column 3, line 69, in equation "(5)" change "k=f=yf" to --k=$\bar{f}$=yf--.

Column 4, line 4, change "f=yf" to --$\bar{f}$=yf--.

Column 5, line 5, change "sound" to --second--.

UNITED STATES PATENT AND TRADEMARK OFFICE
CERTIFICATE OF CORRECTION

PATENT NO. : 4,180,307
DATED : December 25, 1979
INVENTOR(S) : MASAMICHI TATEOKA, ET AL It is certified that error appears in the above-identified patent and that said Letters Patent are hereby corrected as shown below:

Column 5, line 7, change "sound" to --second--.

Column 8, last line, change "comprising" to --comprise--.

Column 9, line 5, change "satisfying" to --satisfies--.

Column 9, last line, delete "wherein".

Column 10, line 13, delete "wherein".

Signed and Sealed this

Eighth Day of July 1980

[SEAL]

Attest:

SIDNEY A. DIAMOND

Attesting Officer

Commissioner of Patents and Trademarks